(12) United States Patent
Jeffries et al.

(10) Patent No.: US 7,140,041 B2
(45) Date of Patent: Nov. 21, 2006

(54) DETECTING DISSEMINATION OF MALICIOUS PROGRAMS

(75) Inventors: Clark Debs Jeffries, Durham, NC (US); Charles Steven Lingafelt, Durham, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 10/120,705

(22) Filed: Apr. 11, 2002

(65) Prior Publication Data

US 2003/0196095 A1    Oct. 16, 2003

(51) Int. Cl.
G06F 11/30    (2006.01)

(52) U.S. Cl. .......................... 726/24; 713/188; 726/22; 726/23

(58) Field of Classification Search ................. 713/188
See application file for complete search history.

(56) References Cited

U.S. PATENT DOCUMENTS

| | | | |
|---|---|---|---|
| 5,414,833 A | 5/1995 | Hershey et al. | 395/575 |
| 5,606,668 A | 2/1997 | Shwed | 395/200.11 |
| 5,825,750 A * | 10/1998 | Thompson | 370/244 |
| 5,958,053 A * | 9/1999 | Denker | 726/1 |
| 6,009,475 A | 12/1999 | Shrader | 709/249 |
| 6,016,546 A * | 1/2000 | Kephart et al. | 726/24 |
| 6,119,236 A * | 9/2000 | Shipley | 726/22 |
| 6,182,226 B1 | 1/2001 | Reid et al. | 713/201 |
| 6,185,680 B1 | 2/2001 | Shimbo et al. | 713/160 |
| 6,304,975 B1 | 10/2001 | Shipley | 713/201 |
| 6,389,419 B1 * | 5/2002 | Wong et al. | 707/7 |
| 6,487,666 B1 * | 11/2002 | Shanklin et al. | 726/23 |
| 6,519,703 B1 * | 2/2003 | Joyce | 726/22 |
| 7,017,185 B1 * | 3/2006 | Wiley et al. | 726/23 |
| 2002/0032871 A1 * | 3/2002 | Malan et al. | 713/201 |
| 2002/0035683 A1 * | 3/2002 | Kaashoek et al. | 713/154 |
| 2002/0095492 A1 * | 7/2002 | Kaashoek et al. | 709/224 |
| 2002/0103916 A1 * | 8/2002 | Chen et al. | 709/229 |

(Continued)

FOREIGN PATENT DOCUMENTS

EP    1122932 A2    8/2001

(Continued)

OTHER PUBLICATIONS

Loudon, Kyle. "Mastering Algorithms with C", Aug. 1999, Published by O'Reilly & Associates, Inc., chapters 8 and 12.17-12.20.*

(Continued)

Primary Examiner—Christopher Revak
Assistant Examiner—Kerry McKay
(74) Attorney, Agent, or Firm—Robert A. Voigt, Jr.; Winstead Sechrest & Minick P.C

(57) ABSTRACT

A method, system and computer program product for detecting the dissemination of malicious programs. The degree of randomness in the Internet Protocol (IP) destination addresses of received IP packets to be forwarded to an external network may be detected by performing a hash function on the IP destination addresses thereby generating one or more different hash values. If a high number of different hash values were generated for a small number of IP packets examined, then random IP destination addresses may be detected. By detecting random destination IP addresses, the dissemination of a malicious program, e.g., virus, worm program, may be detected.

30 Claims, 6 Drawing Sheets

U.S. PATENT DOCUMENTS

| | | | |
|---|---|---|---|
| 2002/0157020 A1* | 10/2002 | Royer | 713/201 |
| 2002/0166063 A1* | 11/2002 | Lachman et al. | 713/200 |
| 2002/0199109 A1* | 12/2002 | Boom | 713/188 |
| 2003/0009693 A1* | 1/2003 | Brock et al. | 713/201 |
| 2003/0061514 A1* | 3/2003 | Bardsley et al. | 713/201 |
| 2003/0084344 A1* | 5/2003 | Tarquini et al. | 713/201 |
| 2003/0115485 A1* | 6/2003 | Milliken | 713/201 |
| 2003/0135758 A1* | 7/2003 | Turner | 713/201 |
| 2003/0145225 A1* | 7/2003 | Bruton et al. | 713/201 |
| 2003/0212903 A1* | 11/2003 | Porras et al. | 713/200 |
| 2004/0003116 A1* | 1/2004 | Munger et al. | 709/245 |
| 2004/0221191 A1* | 11/2004 | Porras et al. | 714/4 |

FOREIGN PATENT DOCUMENTS

WO      WO9948303      9/1999

OTHER PUBLICATIONS

Ye et al. Probabilistic Techniques for Intrusion Detection Based on Computer Audit Data. In IEEE Transactions on Systems, Man, and Cybernetics-Part A, vol. 31, No. 4, Jul. 2001.*

Staniford-Chen, S. Cheung, R. Crawford, M. Dilger, J. Frank, J. Hoagland, K. Levitt, C. Wee, R. Yip, and D. Zerkle. GrIDS—a graph based intrusion detection system for large networks. In Proceedings of the 19th National Information Systems Security Conf.*

"Automated Program Analysis for Computer Virus Detection," *IBM Technical Disclosure Bulletin*, vol. 34, No. 2, Jul. 1991, pp. 415-416.

Shiuhpyng Winston Shieh et al. "A Pattern-Oriented Intrusion-Detection Model and Its Applications," *IEEE*, 19991, pp. 327-342.

* cited by examiner

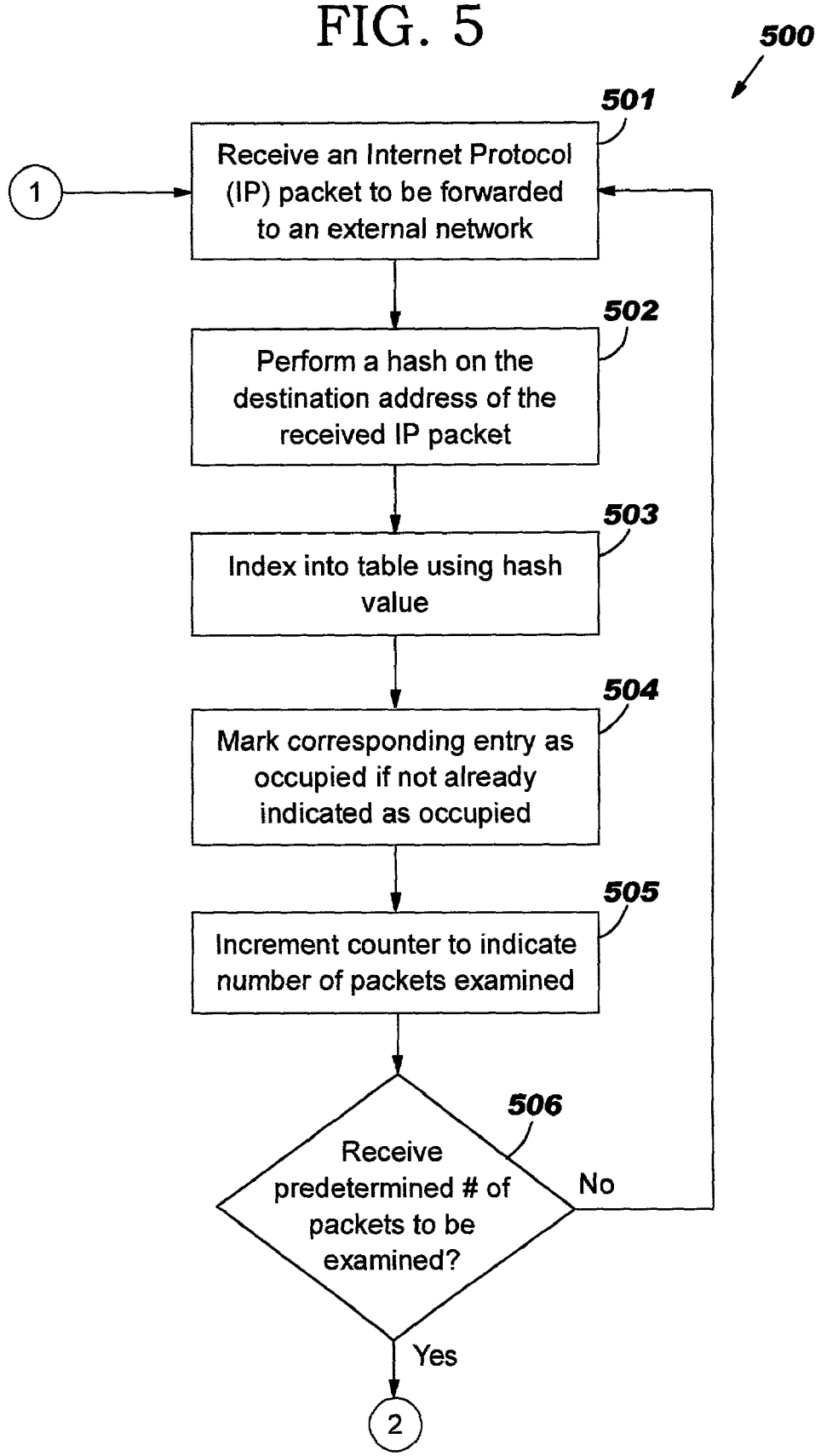

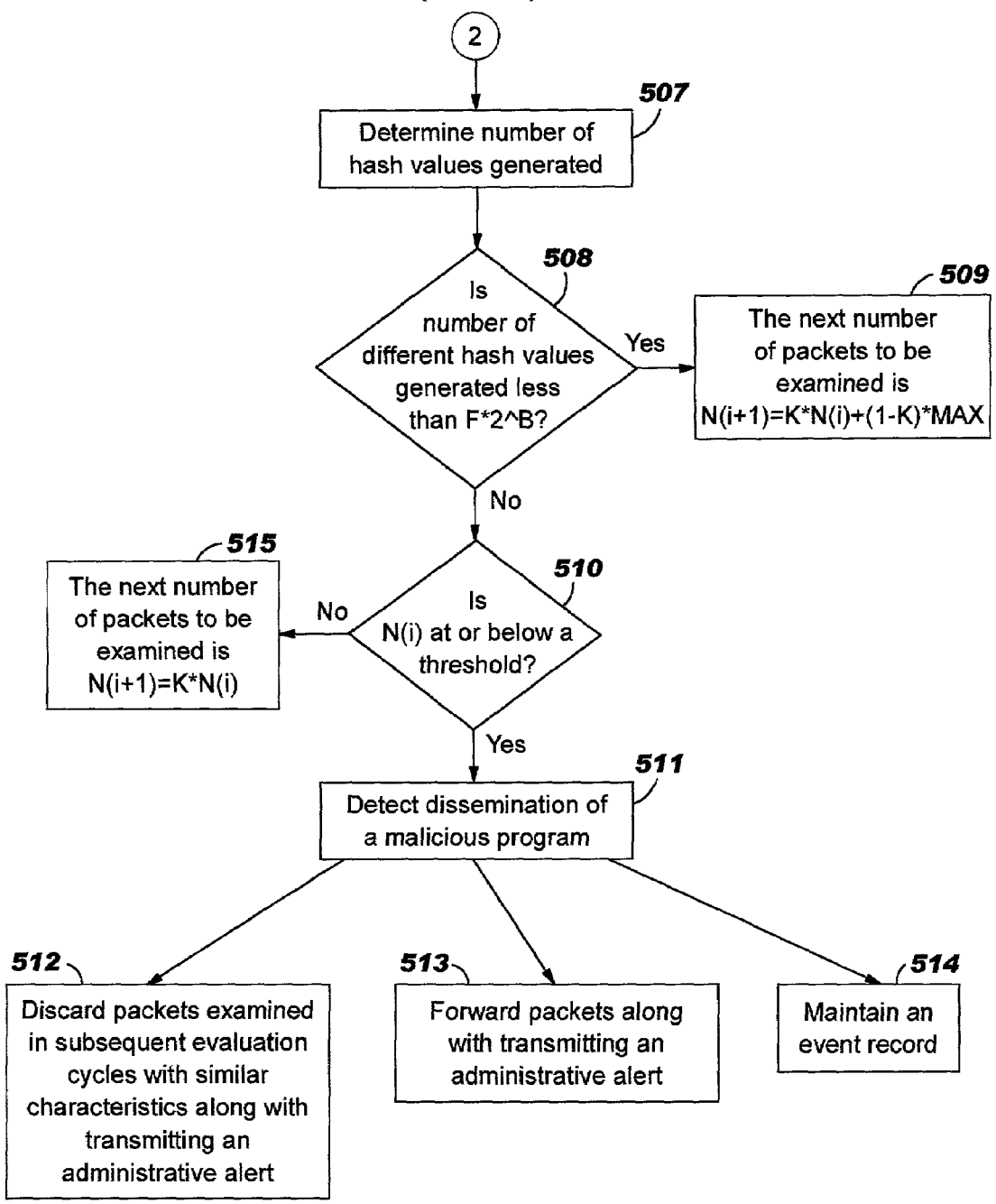

DETECTING DISSEMINATION OF MALICIOUS PROGRAMS

TECHNICAL FIELD

The present invention relates to the field of network security, and more particularly to detecting the randomness in destination addresses in order to detect dissemination of malicious programs.

BACKGROUND INFORMATION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing and an increasingly complex problem.

One example of a network attack on a network device, e.g., server, may commonly be referred to as a denial-of-service attack. In a denial-of-service attack, the network device is flooded with so many additional requests that regular traffic is either slowed or completely interrupted. Typically, the denial-of-service attack uses multiple computers throughout the network. A denial-of-service attack that uses multiple computers may commonly be referred to as a distributed denial-of-service attack.

Such attacks may involve the dissemination through the network, such as the Internet, of a malicious program, e.g., virus, worm program. The malicious program typically contains both the code for sourcing a variety of attacks, e.g., distributed denial-of-service attack, and some basic communication infrastructure to allow for remote control. For example, a user commonly referred to as an attacker may disseminate a malicious program by transmitting the malicious program over the Internet with random Internet Protocol (IP) destination addresses. If one of the random destination addresses is an address of a "vulnerable" computer system, e.g., server, then the malicious program may be installed on that computer system. A computer system may be said to be "vulnerable" if the computer system cannot detect and hence prevent the malicious program from being installed. Hence, an attacker may be able to install malicious programs on other computer systems thereby producing a group of "zombie" computers to carry out the attack.

Computer systems may store security management tools configured to detect known patterns of known malicious programs. For example, security management tools may examine each received IP packet and determine if it matches a known pattern. If so, then the dissemination of a malicious program may be detected. However, if the security management tools do not detect a known pattern, then the security management tools may determine that a malicious program is not being disseminated on the computer system. Hence, a newly created malicious program whose pattern is unknown may not be detected by the security management tools.

As stated above, the dissemination of malicious programs by an attacker typically involves the attacker transmitting the malicious program over the network, e.g., Internet, with random IP destination addresses. By detecting the randomness in IP destination addresses, the dissemination of newly created malicious programs may be detected.

It would therefore be desirable to detect the randomness in Internet Protocol (IP) destination addresses in order to detect the dissemination of malicious programs.

SUMMARY

The problems outlined above may at least in part be solved in some embodiments by detecting the randomness in the Internet Protocol (IP) destination addresses of received IP packets. In one embodiment, the randomness in the IP destination addresses may be detected by performing a hash function on the IP destination addresses thereby generating one or more different hash values. If a high number of different hash values were generated for a small number of IP packets examined, then random IP destination addresses may be detected. By detecting random destination IP addresses, the dissemination of a malicious program, e.g., virus, worm program, may be detected.

In one embodiment of the present invention, a method for detecting the dissemination of a malicious program, e.g., virus, worm program, may comprise the step of a gateway receiving an IP packet of data to be forwarded to an external network, e.g., Internet, from a client. The gateway may be configured to function as an entry/exit point to the external network whereby the gateway performs protocol conversion between different types of networks. The IP packet received by the gateway may contain a malicious program with a random destination address.

The gateway may perform a hash function on the destination address, e.g., 32-bits long, of the received IP packet to generate a hash value, e.g., 8-bit value. It is noted that the dissemination of a malicious program typically has the following additional characteristics: a constant or nearly constant IP packet size, a constant or random IP source address and transfer will involve an unacknowledged datagram. Hence, the gateway may perform a hash function on other fields of the received IP packet such as source address, source port, destination port, packet length, protocol, type of service and identification, conjunctively to or independently from performing the hash function on the destination address. It is further noted that even though the following discusses performing a hash function on the destination address to generate a hash value that the present invention is not to be limited to only performing a hash function on the destination address to generate a hash value. Alternatively, a hash function may be performed on other fields of the received IP packet such as source address, source port, destination port, packet length, protocol, type of service and identification, conjunctively to or independently from performing the hash function on the destination address. It would be appreciated by those of ordinary skill that the present inventive principles apply to hashes performed on such fields. It is further noted these embodiments would fall within the scope of the present invention.

The generated hash value may then be indexed into a table or associative array where each entry may correspond to a particular hash value. The corresponding entry in the table or associative array may be marked as occupied, e.g., a "1" bit value may be stored, if the entry is not already marked as occupied. An unoccupied entry may store the complement of the value stored in entries marked as occupied. A counter, which may be implemented in either software or hardware in the gateway, may be incremented by one to indicate the number of packets examined.

A determination may then be made as to whether the predetermined number of packets, e.g., one thousand packets to be forwarded to the external network, has been examined. In one embodiment, whether the predetermined number of packets has been examined may be determined by the value of the counter as described above. If less than the predetermined number of packets has been examined, then the gateway may receive another IP packet to be forwarded to an external network as described above.

If the predetermined number of packets, e.g., one thousand packets to be forwarded to the external network, has been examined by the gateway, then the gateway may determine the number of different hash values generated from performing the hash function on the IP destination addresses of the predetermined number of packets. In one embodiment, the number of different hash values generated from performing the hash function on the IP destination addresses of the predetermined number of packets may be determined by counting the number of entries in the table marked as being occupied.

A determination may then be made as to whether the number of different hash values generated is less than the following:

$$F*2^B$$

where F is a predetermined fraction, e.g., ¼, and B is a number of bits of the hash value, e.g., 8-bits.

For example, if F has a value of ¼ and the hash values generated by the hash function were 8-bits long, then $F*2^B$ equals 64 (¼*256). Hence, a determination may be made if less than 64 different hash values were generated by performing the hash function on the IP destination addresses of the predetermined number of packets, e.g., one thousand packets to be forwarded to the external network. If less than 64 hash values were generated, then an inference may be made that the gateway may be receiving non-random destination addresses. If 64 or greater different hash values were generated, then an inference may be made that the gateway may be receiving random destination addresses.

As stated above, if the number of different hash values generated were less than $F*2^B$, then an inference may be made that the gateway may be receiving non-random destination addresses as stated above. Since the gateway may be receiving non-random destination addresses, the gateway may examine a higher number of packets up to a maximum number during the next examination cycle captured in the steps described above as illustrated in the following equation:

$$N(i+1)=K*N(i)+(1-K)*MAX$$

where i is an index of the number of packets to be examined; where N(i+1) is the next number of packets to be examined during the next examination cycle; where N(i) is the predetermined number of packets in the examination cycle just completed; where K is a constant between the values of 0 and 1; and where MAX is a maximum number of packets to be examined.

For example, if the gateway examined one thousand packets in the examination cycle just completed (N(i)=1,000) and K=½ and MAX=2,000, then the next number of packets to be examined during the next examination cycle (N(i+1)) equals 1,500.

Upon determining the next number of packets to be examined during the next examination cycle, the gateway may start the next examination cycle by receiving an IP packet to be forwarded to an external network as described above.

If, however, the number of different hash values generated were greater than or equal to $F*2^B$, then an inference may be made that the gateway may be receiving random destination addresses. If the number of different hash values generated were greater than or equal to $F*2^B$, then a determination may be made as to whether the number of packets examined in the examination cycle just completed (N(i)) is less than or equal to a predetermined threshold. If the number of packets examined in the examination cycle just completed (N(i)) is less than or equal to the predetermined threshold, then the dissemination of a malicious program may be indicated. This may occur when a high percentage of entries in the table are marked as occupied versus the total number of entries in the table based on a small number of packets examined. That is, by generating a high number of different hash values for a small number of received packets, it may provide strong evidence of the gateway receiving random IP destination addresses within a short period of time. Receiving random IP destination addresses within a short period of time may be indicative of the dissemination of a malicious program.

Upon detecting the dissemination of a malicious program, one of a series of actions may occur. For example, the IP packets examined in subsequent examination cycles with similar characteristics, e.g., same source address, same length, same protocol, etc., may be discarded by the gateway. By discarding packets with similar characteristics to the IP packets just examined, the dissemination of a malicious program may be prevented. Furthermore, the gateway may transmit an alert to a responsible administrator indicating that the dissemination of a malicious program has been detected. Another activity, may be that the IP packets examined in the examination cycle just completed may be forwarded to the destinations specified by the destination addresses. Furthermore, in conjunction with forwarding the IP packets examined, the gateway may transmit an alert to a responsible administrator indicating that the dissemination of a malicious program has been detected. By transmitting the alert, in conjunction with forwarding the IP packets examined, IP packets examined in subsequent examination cycles with similar characteristics, e.g., same source address, same length, same protocol, etc., to the forwarded IP packets may be discarded by the gateway. By discarding packets with similar characteristics, e.g., same source address, same length, same protocol, etc., to the forwarded IP packets, the dissemination of a malicious program may be prevented. In conjunction with either of the above activities or independently from the above activities, the gateway may maintain an event record of detecting the dissemination of the malicious program.

However, if the number of packets examined in the examination cycle just completed (N(i)) exceeds the predetermined threshold, then the gateway may examine a lower number of packets during the next examination cycle as illustrated in the following equation:

$$N(i+1)=K*N(i)$$

where i is an index of the number of packets to be examined; where N(i+1) is the next number of packets to be examined during the next examination cycle; where K is a constant between the values of 0 and 1; and where N(i) is the predetermined number of packets in the examination cycle just completed.

The gateway may examine a lower number of packets during the next examination cycle in order to ensure that the gateway is receiving random destination addresses from the dissemination of a malicious program and not detecting randomness from normal traffic. For example, if the gateway examined one thousand packets in the examination cycle just completed (N(i)=1,000) and K=½, then the next number of packets to be examined (N(i+1)) equals 500.

Upon determining the next number of packets to be examined during the next examination cycle, the gateway may start the next examination cycle by receiving an IP packet to be forwarded to an external network as described above.

It is noted that the above steps may be performed by other devices such as a router, switch or edge device. It is further noted that even though the above describes detecting the dissemination of a malicious program by detecting the randomness in IP destination addresses that additional factors may be used conjunctively to or independently from the factor of detecting random IP destination addresses. For example, the dissemination of a malicious program typically has the following additional characteristics: a constant or nearly constant IP packet size, a constant or random IP source address, transfer will involve an unacknowledged datagram. These additional characteristics may be used conjunctively to or independently from the factor of detecting random IP destination addresses.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 5 is a flowchart of a method for detecting a dissemination of a malicious program in accordance with the present invention.

DETAILED DESCRIPTION

It is noted that even though the description of the present invention describes detecting the dissemination of a malicious program by detecting the randomness in IP destination addresses that additional factors may be used conjunctively or independently from the factor of detecting random IP destination addresses. For example, the dissemination of a malicious program typically has the following additional characteristics: a constant or nearly constant IP packet size, a constant or random IP source address and transfer will involve an unacknowledged datagram. These additional characteristics may be used conjunctively or independently from the factor of detecting random IP destination addresses. It is further noted that embodiments applying these additional characteristics either conjunctively to or independently from the factor of detecting random IP destination addresses would fall within the scope of the present invention.

Figure 1:
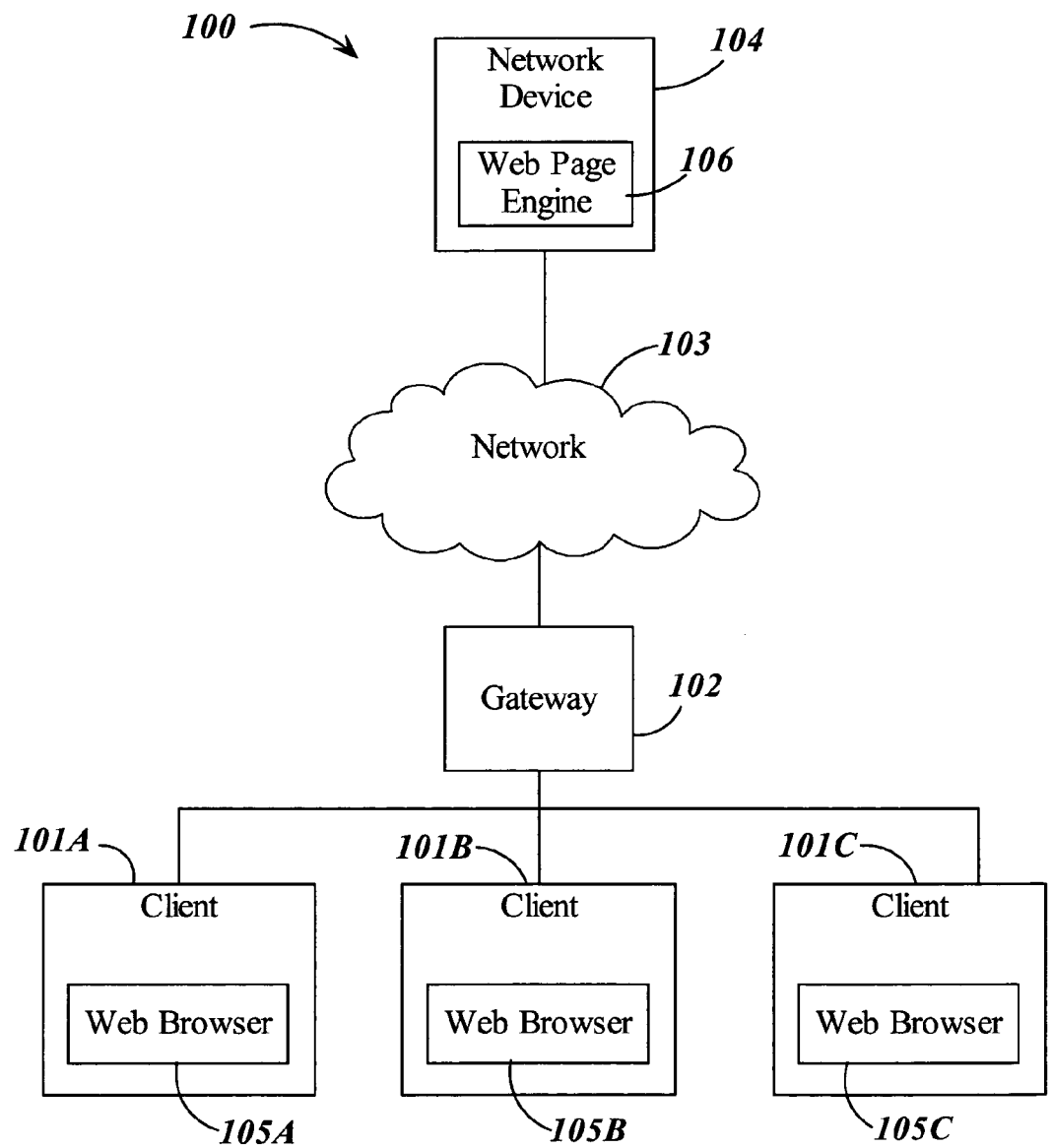
FIG. 1 illustrates a network system configured in accordance with the present invention.

FIG. 1—Network System

FIG. 1 illustrates an embodiment of a network system 100 in accordance with the present invention. Network system 100 may comprise one or more clients 101A–C coupled to an external network 103, e.g., Internet, via a gateway 102. Gateway 102 may be configured to function as an entry/exit point to external network 103 whereby gateway 102 performs protocol conversion between different types of networks. Clients 101A–C may collectively or individually be referred to as clients 101 or client 101, respectively. A more detailed description of client 101 is provided below in conjunction with FIG. 2. A more detailed description of gateway 102 is provided further below in conjunction with FIG. 4. In one embodiment, clients 101A–C may be coupled to a router (not shown) located at the edge of a subnet (not shown), e.g., Local Area Network (LAN), where the subnet may comprise clients 101A–C coupled to the router (not shown). It is noted that network system 100 may be divided into multiple subnets where each subnet (not shown), e.g., Local Area Network (LAN), Campus LAN, may be an interconnected, but independent, segment or domain of network system 100.

As stated above, gateway 102 may be coupled to an external network 103. External network 103 may be a LAN, e.g., Ethernet, Token Ring, ARCnet, or a Wide Area Network (WAN), e.g., Internet. External network 103 may be coupled to a network device 104, e.g., web server, server in a server farm, that may be subject to the installment of a malicious program. A more detailed description of network device 104 is provided further below in conjunction with FIG. 3. It is noted that the connection between clients 101 and gateway 102 may be any medium type, e.g., wireless, wired. It is further noted that client 101 may be any type of device, e.g., wireless, Personal Digital Assistant (PDA), portable computer system, cell phone, personal computer system, workstation, Internet appliance, configured with the capability of connecting to network 103 and consequently communicating with network device 104. It is further noted that network system 100 may be any type of system that has at least one client 101, at least one device such as gateway 102, an external network 103 and a network device 104 subject to the installment of a malicious program. It is further noted that network system 100 is not to be limited in scope to any one particular embodiment. For example, gateway 102 may be a router located at the edge of a subnet. In another example, gateway 102 may be a switch configured to direct the flow of data from one network to another network. In another example, gateway 102 may be an edge device, e.g., net enforcer, configured to monitor traffic at the edge of a subnet.

Referring to FIG. 1, each client 101A–C may comprise a web browser 105A–C, respectively, which may be configured for communicating with network 103, e.g., Internet, and for reading and executing web pages. Browsers 105A–C may collectively or individually be referred to as browsers 105 or browser 105, respectively. While the illustrated client engine is a web browser 105, those skilled in the art will recognize that other client engines may be used in accordance with the present invention.

Network device 104, e.g., web server, may comprise a web page engine 106 for maintaining and providing access to an Internet web page which is enabled to forward static web pages to web browser 105 of client 101. Web pages are typically formatted as a markup language file, for example, HyperText Markup Language (HTML) or Extended Markup Language (XML).

Figure 2:
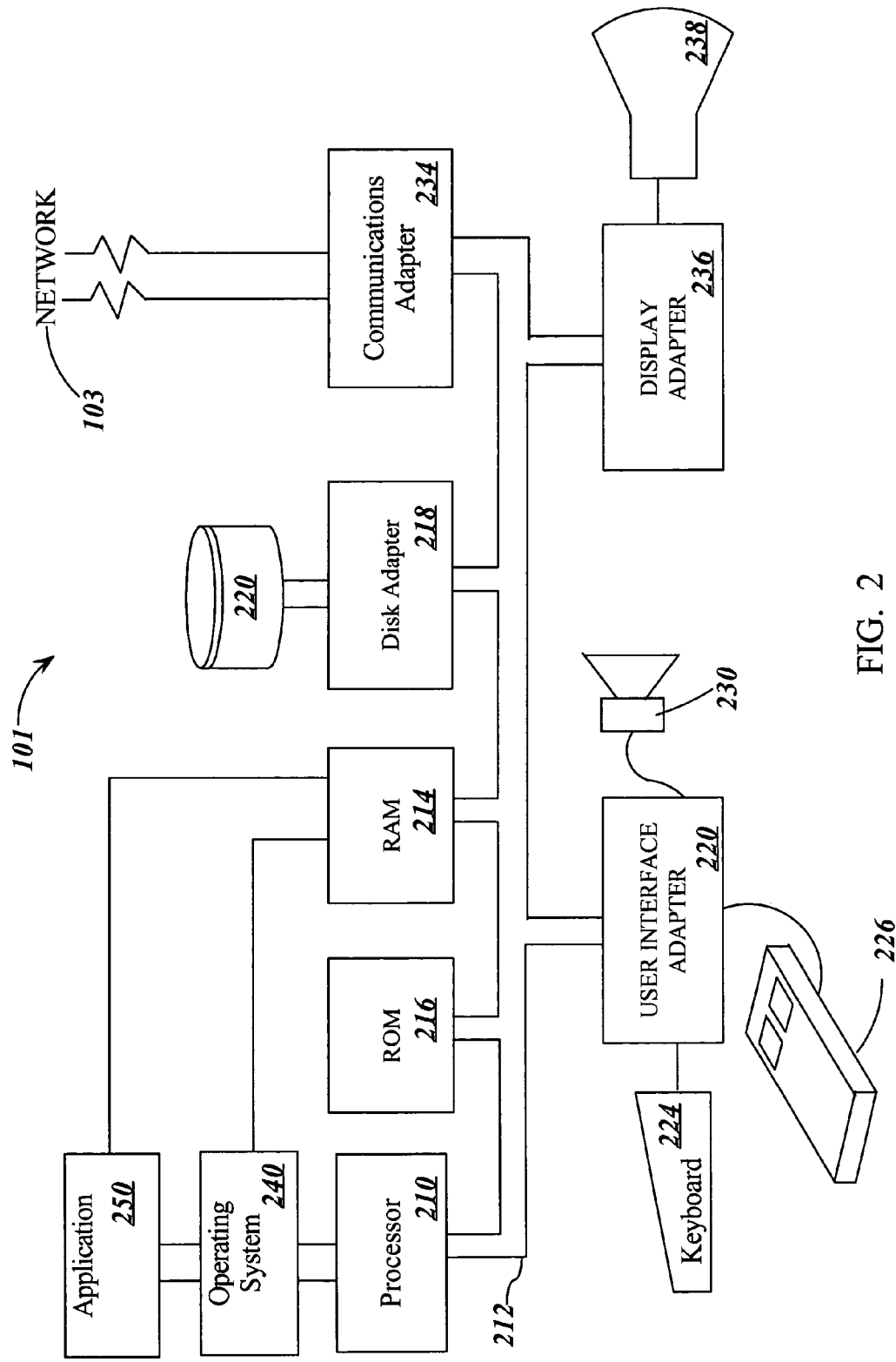
FIG. 2 illustrates an embodiment of a client in the network system configured in accordance with the present invention.

FIG. 2—Hardware Configuration of Client

FIG. 2 illustrates a typical hardware configuration of client 101 which is representative of a hardware environment for practicing the present invention. Client 101 may have a central processing unit (CPU) 210 coupled to various other components by system bus 212. An operating system 240 may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, web browser 105. Read-Only Memory (ROM) 216 may be coupled to system bus 212 and include a basic input/output system ("BIOS") that controls certain basic functions of client 101. Random access memory (RAM) 214 and Input/Output (I/O) adapter 218 may also be coupled to system bus 212. It should be noted that software components including operating system 240 and application 250 may be loaded into RAM 214 which may be the computer system's main memory for execution. I/O adapter 218 may be a small computer system interface ("SCSI") adapter that communicates with a disk unit 220, e.g., disk drive. It is noted that web browser 105 may reside in disk unit 220 or in application 250.

Referring to FIG. 2, client 101 may further comprise a communications adapter 234 coupled to bus 212. Communications adapter 234 may enable client 101 to communicate with gateway 102 (FIG. 1). Further, communications adapter 234 may enable client 101 to communicate with network device 104 (FIG. 1) network 103. I/O devices may also be connected to system bus 212 via a user interface adapter 222 and a display adapter 236. Keyboard 224, mouse 226 and speaker 230 may all be interconnected to bus 212 through user interface adapter 222. Event data may be inputted to client 101 through any of these devices. A display monitor 238 may be connected to system bus 212 by display adapter 236. In this manner, a user is capable of inputting, e.g., issuing requests to read web pages, transmitting a malicious program across network 103 with random Internet Protocol (IP) destination addresses, to client 101 through keyboard 224 or mouse 226 and receiving output from client 101 via display 238.

Figure 3:
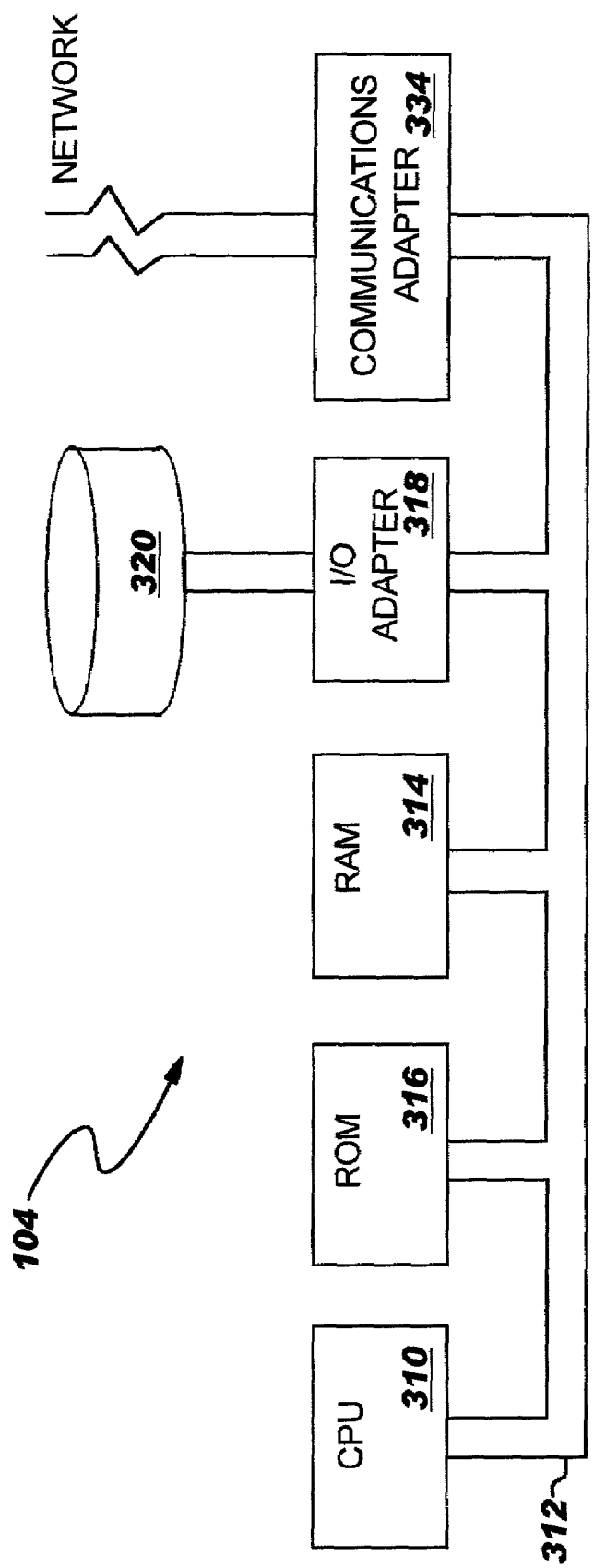
FIG. 3 illustrates an embodiment of a network device in the network system that may be subject to a denial-of-service attack in accordance with the present invention.

FIG. 3—Hardware Configuration of Network Device

FIG. 3 illustrates an embodiment of the present invention of network device 104. Referring to FIG. 3, network device 104 may comprise a processor 310 coupled to various other components by system bus 312. Read-Only Memory (ROM) 316 may be coupled to system bus 312 and include a basic input/output system ("BIOS") that controls certain basic functions of network device 104. Random access memory (RAM) 314, disk adapter 318 and communications adapter 334 may also be coupled to system bus 312. RAM 312 may be network device's 105 main memory for execution. Disk adapter 318 may be a small computer system interface ("SCSI") adapter that communicates with disk units 320, e.g., disk drive. Communications adapter 334 may interconnect bus 312 with network 104 enabling network device 104 to communicate with gateway 102 (FIG. 1) and client 101 (FIG. 1).

Figure 4:
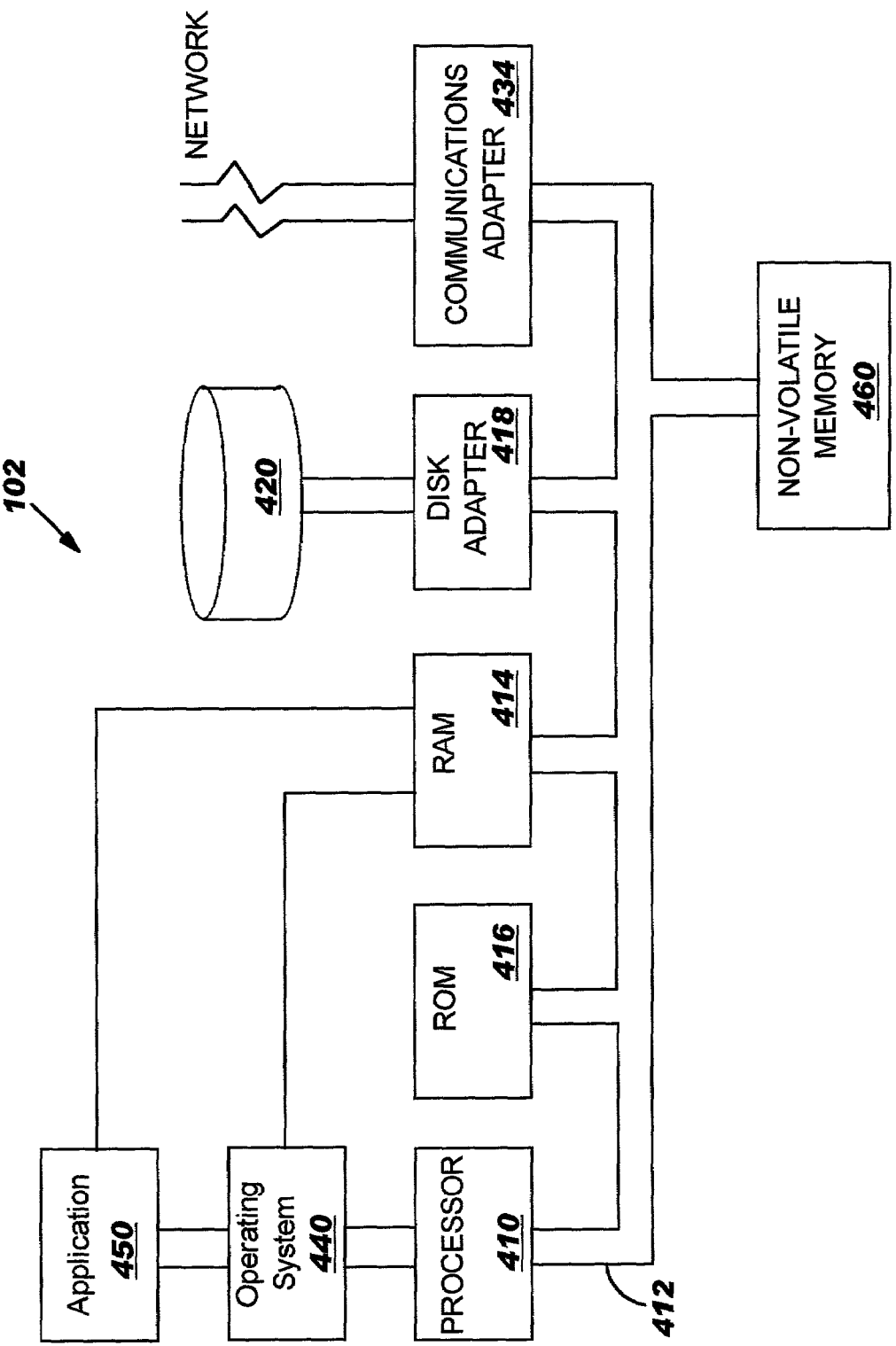
FIG. 4 illustrates an embodiment of a gateway in accordance with the present invention.

FIG. 4—Hardware Configuration of Gateway

FIG. 4 illustrates an embodiment of the present invention of gateway 102. Referring to FIG. 4, gateway 102 may comprise a processor 410 coupled to various other components by system bus 412. An operating system 440, may run on processor 410 and provide control and coordinate the functions of the various components of FIG. 4. An application 450 in accordance with the principles of the present invention may run in conjunction with operating system 440 and provide calls to operating system 440 where the calls implement the various functions or services to be performed by application 450. Application 450 may include, for example, a program for detecting the dissemination of a malicious program as described in FIG. 5. Read-Only Memory (ROM) 416 may be coupled to system bus 412 and include a basic input/output system ("BIOS") that controls certain basic functions of gateway 102. Random access memory (RAM) 414, disk adapter 418 and communications adapter 434 may also be coupled to system bus 412. It should be noted that software components including operating system 440 and application 450 may be loaded into RAM 414 which may be the gateway's 102 main memory for execution. Disk adapter 418 may be a small computer system interface ("SCSI") adapter that communicates with a disk unit 420, e.g., disk drive. It is noted that the program of the present invention that detects the dissemination of a malicious program, as described in FIG. 5, may reside in disk unit 420 or in application 450. Communications adapter 434 may interconnect bus 412 with network 104 enabling gateway 102 to communicate with network device 104 (FIG. 1) and client 101 (FIG. 1). Gateway 102 may further comprise a non-volatile memory 460 coupled to bus 412. Non-volatile memory 460 may be configured to store a hash table as described in greater detail in conjunction with FIG. 5. It is noted that the hash table may be stored in ROM 416, e.g., flash ROM, disk unit 420. It is further noted that the hash table may be stored in other storage units not illustrated and that such storage units would be known to a person of ordinary skill in the art. It is further noted that such storage units would fall within the scope of the present invention. It is further noted that the description of gateway 102 in FIG. 4 may also be the description of a router located at the edge of a subnet, a switch or an edge device. It is further noted that these other devices, e.g., router, switch, edge device, may also store the program of the present invention that detects the dissemination of a malicious program, as described in FIG. 5, in their disk unit 420 or application 450.

Implementations of the invention include implementations as a computer system programmed to execute the method or methods described herein, and as a computer program product. According to the computer system implementations, sets of instructions for executing the method or methods are resident in RAM 414 of one or more computer systems configured generally as described above. Until required by gateway 102, the set of instructions may be stored as a computer program product in another computer memory, for example, in disk drive 420 (which may include a removable memory such as an optical disk or floppy disk for eventual use in disk drive 420). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 5—Method for Detecting a Dissemination of a Malicious Program

FIG. 5 is a flowchart of one embodiment of the present invention of a method 500 for detecting the dissemination of a malicious program, e.g., virus, worm program. As stated in the Background Information section, computer systems may store security management tools configured to detect known patterns of known malicious programs. For example, security management tools may examine each received Internet Protocol (IP) packet and determine if it matches a known pattern. If so, then the dissemination of a malicious program may be detected. However, if the security management tools do not detect a known pattern, then the security management tools may determine that a malicious program is not being disseminated on the computer system. Hence, a newly created malicious program whose pattern is unknown may not be detected by the security management tools. Since the dissemination of malicious programs by an attacker typically involves transmitting the malicious program over the network, e.g., Internet, with random IP destination addresses, the dissemination of malicious programs may be detected by detecting the randomness in IP destination addresses. It would therefore be desirable to detect the randomness in IP destination addresses in order to detect the dissemination of malicious programs. Method 500 is a method for detecting the randomness in IP destination addresses in order to detect the dissemination of malicious programs.

Referring to FIG. 5, in conjunction with FIGS. 1 and 4, in step 501, gateway 102 may receive an IP packet of data to be forwarded to another network 103, e.g., Internet, from client 101. As stated in the Background Information section, an attacker may disseminate a malicious program, e.g., virus, worm program, by transmitting the malicious program over the network with random IP destination addresses. For example, a user of client 101, e.g., client 101A, may disseminate a malicious program onto several vulnerable computer systems, e.g., network device 104, by transmitting IP packets storing the malicious program in its payload over network 103. These IP packets may contain random IP destination addresses in their headers where the IP destination address may be an address of a vulnerable computer system, e.g., network device 104. Hence, the IP packet received by gateway 102 may contain a malicious program in its payload with a random IP destination address in its header.

In step 502, gateway 102 may perform a hash function on the destination address, e.g., 32-bits long, of the received IP packet to generate a hash value, e.g., 8-bit value. In one embodiment, gateway 102 may extract and concatenate the IP destination address and IP source port (if it exists) from the packet header of the received IP packet. The concatenation of the two fields may then be inputted to the hash function to generate a hash value. It is noted that the dissemination of a malicious program typically has the following additional characteristics: a constant or nearly constant IP packet size, a constant or random IP source address and transfer will involve an unacknowledged datagram. Hence, gateway 102 may perform a hash function on other fields of the received IP packet such as source address, source port, destination port, packet length, protocol, type of service and identification, conjunctively to or independently from performing the hash function on the destination address. It is further noted that even though the following discusses performing a hash function on the destination address to generate a hash value that the present invention is not to be limited to only performing a hash function on the destination address to generate a hash value. Alternatively, a hash function may be performed on other fields of the received IP packet such as source address, source port, destination port, packet length, protocol, type of service and identification, conjunctively to or independently from performing the hash function on the destination address. It would be appreciated by those of ordinary skill that the present inventive principles apply to hashes performed on such fields. It is further noted these embodiments would fall within the scope of the present invention.

In step 503, the hash value may be indexed into a table or associative array where each entry may correspond to a particular hash value. In step 504, the corresponding entry in the table or associative array may be marked as occupied, e.g., a "1" bit value may be stored, if the entry is not already marked as occupied. An unoccupied entry may store the complement of the value stored in entries marked as occupied. In step 505, a counter, which may be implemented in either software or hardware in gateway 102, may be incremented by one to indicate the number of packets examined.

In step 506, a determination may be made as to whether the predetermined number of packets, e.g., one thousand packets to be forwarded to external network 103, has been examined. In one embodiment, whether the predetermined number of packets has been examined may be determined by the value of the counter as described above. If less than the predetermined number of packets has been examined, then gateway 102 may receive another IP packet of data to be forwarded to external network 103 in step 501.

If the predetermined number of packets, e.g., one thousand packets to be forwarded to external network 103, has been examined by gateway 102, then gateway 102, in step 507, may determine the number of different hash values generated from performing the hash function on the IP destination addresses of the predetermined number of packets. In one embodiment, the number of different hash values generated from performing the hash function on the IP destination addresses of the predetermined number of packets may be determined by counting the number of entries in the table marked as being occupied.

In step 508, a determination may be made as to whether the number of different hash values generated is less than the following:

$$F * 2^B$$

where F is a predetermined fraction, e.g., ¼, and B is a number of bits of the hash value, e.g., 8-bits.

For example, if F has a value of ¼ and the hash values generated by the hash function in step 502 were 8-bits long, then $F*2^B$ equals 64 (¼*256). Hence, a determination may be made if less than 64 different hash values were generated by performing the hash function on the IP destination addresses of the predetermined number of packets, e.g., one thousand packets to be forwarded to external network 103. If less than 64 hash values were generated, then an inference may be made that gateway 102 may be receiving non-random destination addresses. If 64 or greater different hash values were generated, then an inference may be made that gateway 102 may be receiving random destination addresses.

For example, if the length of the hash values generated in step 502 were 8-bits long, then there are a total possible $2^8$ (256) different hash values that may be generated. Each hash value may be able to index into a particular entry in a table. Hence, the table may comprise 256 entries where each entry may correspond to a particular hash value. If 200 different hash values were generated by performing the hash function on the IP destination addresses of the predetermined number of packets, e.g., one thousand packets to be forwarded to external network 103, then 200 out of the 256 entries in the table are marked as being occupied. Since the percentage of entries marked versus the total number of entries in the table is high, it may be indicative of receiving random IP destination addresses. That is, since a large number of different hash values were generated, it may be indicative of receiving random IP destination addresses. If the percentage of entries marked versus the total number of entries in the table were low, then it may be indicative of receiving non-random IP destination addresses. That is, since a small number of different hash values were generated, it may be indicative of receiving non-random IP destination addresses. The determination of whether gateway 102 may be receiving random or non-random IP destination addresses may be captured in the formula $F*2^B$ as discussed above.

Referring to step 508, if the number of different hash values generated were less than $F*2^B$, then an inference may be made that gateway 102 may be receiving non-random destination addresses as stated above. Since gateway 102 may be receiving non-random destination addresses, gateway 102 may examine a higher number of packets up to a maximum number during the next examination cycle captured in steps 501–506 as illustrated in the following equation:

$$N(i+1)=K*N(i)+(1-K)*MAX \quad (EQ1)$$

where i is an index of the number of packets to be examined; where N(i+1) is the next number of packets to be examined during the next examination cycle; where N(i) is the predetermined number of packets in the examination cycle just completed; where K is a constant between the values of 0 and 1; and where MAX is a maximum number of packets to be examined.

For example, if gateway 102 examined one thousand packets in the examination cycle just completed (N(i)=1,000) and K=½ and MAX=2,000, then the next number of packets to be examined during the next examination cycle (N(i+1)) equals 1,500. Hence, gateway 102 will examine one thousand five hundred packets during the next examination cycle as discussed above in steps 501–506.

Upon determining the next number of packets to be examined during the next examination cycle, gateway 102 may start the next examination cycle by receiving an IP packet to be forwarded to external network 103 in step 501.

Referring to step 508, if the number of different hash values generated were greater than or equal to $F*2^B$, then an inference may be made that gateway 102 may be receiving random destination addresses. If the number of different hash values generated were greater than or equal to $F*2^B$, then a determination may be made in step 510 as to whether the number of packets examined in the examination cycle just completed (N(i)) is less than or equal to a predetermined threshold. If the number of packets examined in the examination cycle just completed (N(i)) is less than or equal to the predetermined threshold, then the dissemination of a malicious program may be detected in step 511. This may occur when a high percentage of entries in the table are marked as occupied versus the total number of entries in the table based on a small number of packets examined. That is, by generating a high number of different hash values for a small number of received packets, it may provide strong evidence of gateway 102 receiving random IP destination addresses within a short period of time. Receiving random IP destination addresses within a short period of time may be indicative of the dissemination of a malicious program.

Upon detecting the dissemination of a malicious program, one of a series of actions may occur. For example, in step 512, the IP packets examined in subsequent examination cycles with similar characteristics, e.g., same source address, same length, same protocol, etc., to the packets just examined may be discarded by gateway 102. By discarding packets with similar characteristics, e.g., same destination address, same length, same protocol, etc., to the IP packets just examined, the dissemination of a malicious program may be prevented. Furthermore, gateway 102 may transmit an alert to a responsible administrator indicating that the dissemination of a malicious program has been detected. Another activity, captioned in step 513, may be that the IP packets examined in the examination cycle just completed may be forwarded to the destinations specified by the destination addresses. Furthermore, in conjunction with forwarding the IP packets examined, gateway 102 may transmit an alert to a responsible administrator indicating that the dissemination of a malicious program has been detected. By transmitting the alert, in conjunction with forwarding the IP packets examined, IP packets examined in subsequent examination cycles with similar characteristics, e.g., same source address, same length, same protocol, etc., to the forwarded IP packets may be discarded by gateway 102. By discarding packets with similar characteristics, e.g., same source address, same length, same protocol, etc., to the forwarded IP packets, the dissemination of a malicious program may be prevented. In conjunction with steps 512 and/or 513, or independently from steps 512 and 513, gateway 102 may maintain an event record of detecting the dissemination of the malicious program in step 514. In one embodiment, the event record may contain the day/date/time of the occurrence of detecting the dissemination of the malicious program. The event record may further contain the source user address as well as the captured data.

Referring to step 510, if the number of packets examined in the examination cycle just completed (N(i)) exceeds a predetermined threshold, then gateway 102 may examine a lower number of packets during the next examination cycle in step 515 as illustrated in the following equation:

$$N(i+1)=K*N(i) \quad (EQ2)$$

where i is an index of the number of packets to be examined; where N(i+1) is the next number of packets to be examined during the next examination cycle; where K is a constant between the values of 0 and 1; and where N(i) is the predetermined number of packets in the examination cycle just completed.

Gateway 102 may examine a lower number of packets during the next examination cycle in order to ensure that gateway 102 is receiving random destination addresses from the dissemination of a malicious program and not detecting randomness from normal traffic. For example, if gateway 102 examined one thousand packets in the examination cycle just completed (N(i)=1,000) and K=½, then the next number of packets to be examined (N(i+1)) equals 500. Hence, gateway 102 will examine five hundred packets during the next examination cycle as discussed above in steps 501–506.

Upon determining the next number of packets to be examined during the next examination cycle, gateway 102 may start the next examination cycle by receiving an IP packet to be forwarded to an external network 103 in step 501.

It is noted that method 500 may be executed in a different order presented and that the order presented in the discussion of FIG. 5 is illustrative. It is further noted that certain steps in FIG. 5 may be executed almost concurrently. It is further noted that the steps of method 500 may be performed by other devices such as a router, switch or edge device. It is further noted that even though the above describes detecting the dissemination of a malicious program by detecting the randomness in IP destination addresses that additional factors may be used conjunctively to or independently from the factor of detecting random IP destination addresses. For example, the dissemination of a malicious program typically has the following additional characteristics: a constant or nearly constant IP packet size, a constant or random IP source address, transfer will involve an unacknowledged datagram. These additional characteristics may be used conjunctively to or independently from the factor of detecting random IP destination addresses.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for detecting a dissemination of a malicious program comprising the steps of:
    receiving a packet of data to be forwarded to another network;
    performing a hash function on one or more fields of said packet of data generating a hash value; and
    determining a number of different hash values generated from performing said hash function on said one or more fields of a predetermined number of packets to be forwarded to another network, wherein if said number of different hash values is greater than or equal to a predetermined value then the method further comprises the step of:
        determining if said predetermined number of packets is below a threshold, wherein if said predetermined number of packets is at or below said threshold then said dissemination of said malicious program is detected.

2. The method as recited in claim 1, wherein upon detecting said dissemination of said malicious program, the method further comprises the step of:
    discarding subsequent packets having a selected set of characteristics corresponding to packets examined in determining said number of different hash values generated.

3. The method as recited in claim 2, wherein upon detecting said dissemination of said malicious program, the method further comprises the step of:
    transmitting an administrative alert regarding said detection of said dissemination of said malicious program.

4. The method as recited in claim 1, wherein upon detecting said dissemination of said malicious program, the method further comprises the step of:
    transmitting an administrative alert regarding said detection of said dissemination of said malicious program.

5. The method as recited in claim 1, wherein upon detecting said dissemination of said malicious program, the method further comprises the step of:
    maintaining an event record regarding said detection of said dissemination of said malicious program.

6. The method as recited in claim 1 further comprising the steps of:
    indexing into a table using said hash value generated;
    marking an entry in said table corresponding to said hash value generated as occupied if not already indicated as occupied; and
    incrementing a counter to indicate a number of packets examined.

7. The method as recited in claim 1, wherein if said number of different hash values is less than said predetermined value then the method further comprises the step of:
    examining a next number of packets to be forwarded to another network, wherein said next number of packets to be examined is determined by:

$$N(i+1)=K*N(i)*(1-K)*MAX,$$

wherein i is an index of a number of packets to be examined;
    wherein N(i+1) is said next number of packets to be examined;
    wherein N(i) is said predetermined number of packets;
    wherein K is a constant; and
    wherein MAX is a maximum number of packets to be examined.

8. The method as recited in claim 1, wherein if said predetermined number of packets is greater than said threshold then the method further comprises the step of:
    examining a next number of packets to be forwarded to another network, wherein said next number of packets to be examined is determined by:

$$N(i+1)=K*N(i),$$

wherein i is an index of a number of packets to be examined;
    wherein N(i+1) is said next number of packets to be examined;
    wherein N(i) is said predetermined number of packets; and
    wherein K is a constant.

9. The method as recited in claim 1, wherein said predetermined value is equal to:

$$F*2^B,$$

wherein F is a predetermined fraction; and
    wherein B is a number of bits of said hash value.

10. The method as recited in claim 1, wherein said one or more fields comprises one or more of the following: destination address, source address, source port, destination port, packet length, protocol, type of service and identification.

11. A computer program product embodied in a machine readable medium for detecting a dissemination of a malicious program comprising the programming steps of:
    receiving a packet of data to be forwarded to another network;
    performing a hash function on one or more fields of said packet of data generating a hash value; and
    determining a number of different hash values generated from performing said hash function on said one or more fields of a predetermined number of packets to be forwarded to another network, wherein if said number of different hash values is greater than or equal to a predetermined value then the method further comprises the step of:
        determining if said predetermined number of packets is below a threshold, wherein if said predetermined number of packets is at or below said threshold then said dissemination of said malicious program is detected.

12. The computer program product as recited in claim 11, wherein upon detecting said dissemination of said malicious program, the computer program product further comprises the programming step of:
discarding subsequent packets having a selected set of characteristics corresponding to packets examined in determining said number of different hash values generated.

13. The computer program product as recited in claim 12, wherein upon detecting said dissemination of said malicious program, the computer program product further comprises the programming step of:
transmitting an administrative alert regarding said detection of said dissemination of said malicious program.

14. The computer program product as recited in claim 11, wherein upon detecting said dissemination of said malicious program, the computer program product further comprises the programming step of:
transmitting an administrative alert regarding said detection of said dissemination of said malicious program.

15. The computer program product as recited in claim 11, wherein upon detecting said dissemination of said malicious program, the computer program product further comprises the programming step of:
maintaining an event record regarding said detection of said dissemination of said malicious program.

16. The computer program product as recited in claim 11 further comprising the programming steps of:
indexing into a table using said hash value generated;
marking an entry in said table corresponding to said hash value generated as occupied if not already indicated as occupied; and
incrementing a counter to indicate a number of packets examined.

17. The computer program product as recited in claim 11, wherein if said number of different hash values is less than said predetermined value then the computer program product further comprises the programming step of:
examining a next number of packets to be forwarded to another network, wherein said next number of packets to be examined is determined by:

$$N(i+1)=K*N(i)+(1-K)*\text{MAX},$$

wherein i is an index of a number of packets to be examined;
wherein N(i+1) is said next number of packets to be examined;
wherein N(i) is said predetermined number of packets;
wherein K is a constant; and
wherein MAX is a maximum number of packets to be examined.

18. The computer program product as recited in claim 11, wherein if said predetermined number of packets is greater than said threshold then the computer program product further comprises the programming step of:
examining a next number of packets to be forwarded to another network, wherein said next number of packets to be examined is determined by:

$$N(i+1)=K*N(i),$$

wherein i is an index of a number of packets to be examined;
wherein N(i+1) is said next number of packets to be examined;
wherein N(i) is said predetermined number of packets; and
wherein K is a constant.

19. The computer program product as recited in claim 11, wherein said predetermined value is equal to:

$$F*2^B,$$

wherein F is a predetermined fraction; and
wherein B is a number of bits of said hash value.

20. The computer program product as recited in claim 11, wherein said one or more fields comprises one or more of the following: destination address, source address, source port, destination port, packet length, protocol, type of service and identification.

21. A system, comprising:
a memory unit operable for storing a computer program operable for detecting a dissemination of a malicious program; and
a processor coupled to said memory unit, wherein said processor, responsive to said computer program, comprises:
circuitry operable for receiving a packet of data to be forwarded to another network;
circuitry operable for performing a hash function on a destination address of said packet of data generating a hash value; and
circuitry operable for determining a number of different hash values generated from performing said hash function on destination addresses of a predetermined number of packets to be forwarded to another network, wherein if said number of different hash values is greater than or equal to a predetermined value then said processor further comprises:
circuitry operable for determining if said predetermined number of packets is below a threshold, wherein if said predetermined number of packets is at or below said threshold then said dissemination of said malicious program is detected.

22. The system as recited in claim 21, wherein upon detecting said dissemination of said malicious program, said processor further comprises:
circuitry operable for discarding subsequent packets having a selected set of characteristics corresponding to packets examined in determining said number of different hash values generated.

23. The system as recited in claim 22, wherein upon detecting said dissemination of said malicious program, said processor further comprises:
circuitry operable for transmitting an administrative alert regarding said detection of said dissemination of said malicious program.

24. The system as recited in claim 21, wherein upon detecting said dissemination of said malicious program, said processor further comprises:
circuitry operable for transmitting an administrative alert regarding said detection of said dissemination of said malicious program.

25. The system as recited in claim 21, wherein upon detecting said dissemination of said malicious program, said processor further comprises:
circuitry operable for maintaining an event record regarding said detection of said dissemination of said malicious program.

26. The system as recited in claim 21, wherein said processor further comprises:
circuitry operable for indexing into a table using said hash value generated;

circuitry operable for marking an entry in said table corresponding to said hash value generated as occupied if not already indicated as occupied; and circuitry operable for incrementing a counter to indicate a number of packets examined.

27. The system as recited in claim 21, wherein if said number of different hash values is less than said predetermined value then said processor further comprises:

circuitry operable for examining a next number of packets to be forwarded to another network, wherein said next number of packets to be examined is determined by:

$$N(i+1)=K*N(i)+(1-K)*MAX,$$

wherein i is an index of a number of packets to be examined;

wherein $N(i+1)$ is said next number of packets to be examined;

wherein $N(i)$ is said predetermined number of packets;

wherein K is a constant; and wherein MAX is a maximum number of packets to be examined.

28. The system as recited in claim 21, wherein if said predetermined number of packets is greater than said threshold then said processor further comprises:

circuitry operable for examining a next number of packets to be forwarded to another network, wherein said next number of packets to be examined is determined by:

$$N(i+1)=K*N(i),$$

wherein i is an index of a number of packets to be examined;

wherein $N(i+1)$ is said next number of packets to be examined;

wherein $N(i)$ is said predetermined number of packets; and wherein K is a constant.

29. The system as recited in claim 21, wherein said predetermined value is equal to:

$$F*2^B,$$

wherein F is a predetermined fraction; and wherein B is a number of bits of said hash value.

30. The system as recited in claim 21, wherein said one or more fields comprises one or more of the following: destination address, source address, source port, destination port, packet length, protocol, type of service and identification.

* * * * *